HALE & GOODMAN.
Gage-Lathe.
No. 1,400.
Reissued Feb. 10, 1863.
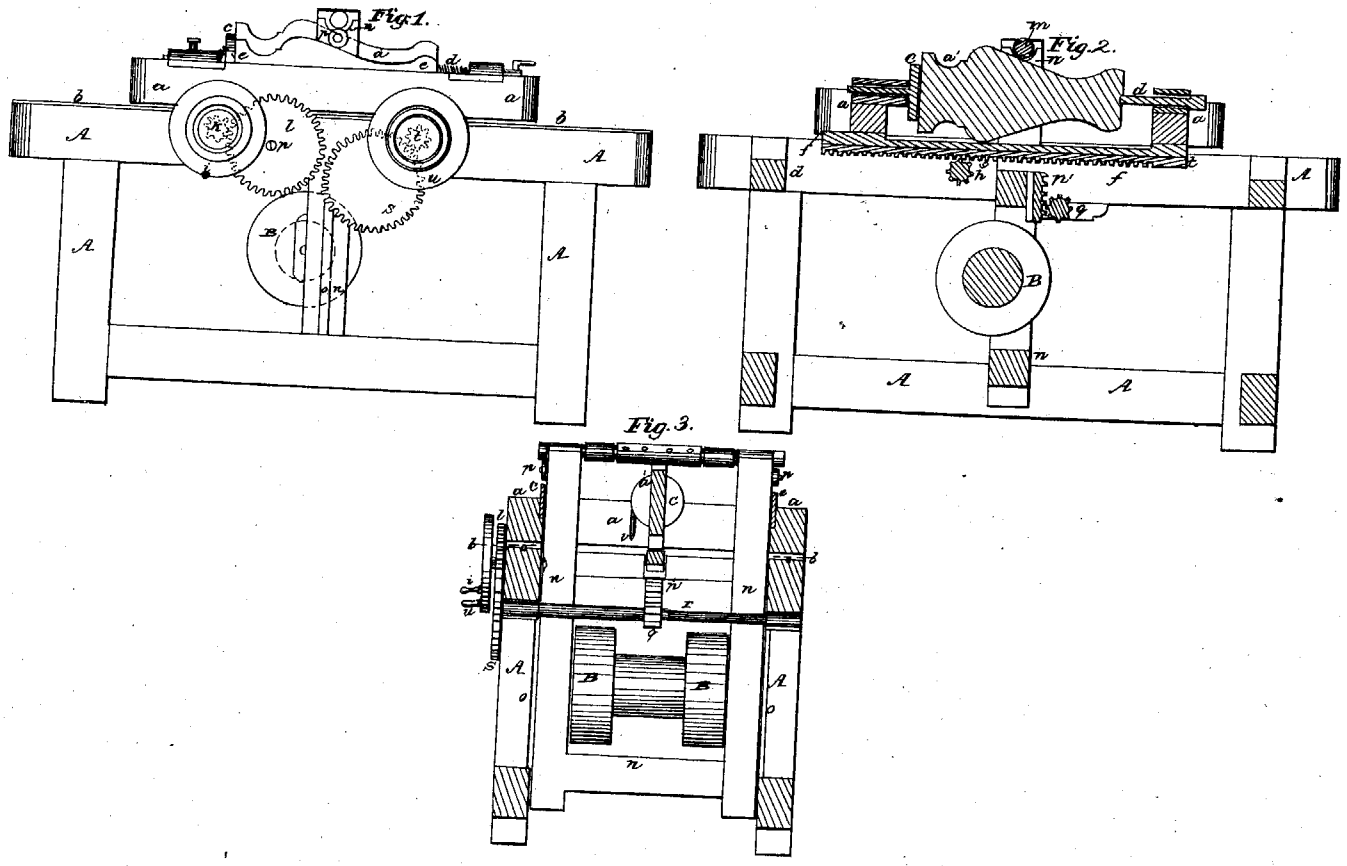
N. PETERS, PHOTO-LITHOGRAPHER, WASHINGTON, D. C.

UNITED STATES PATENT OFFICE.

WARREN HALE, ALLEN GOODMAN, LORENZO HALE, AND JOHN W. GOODMAN, OF NORTH DANA, MASSACHUSETTS, ASSIGNEES OF SAID WARREN HALE AND ALLEN GOODMAN.

IMPROVEMENT IN MACHINERY FOR SHAPING IRREGULAR SURFACES IN WOOD.

Specification forming part of Letters Patent No. 4,120, dated July 22, 1845; extended seven years; Reissue No. 1,400, dated Februry 10, 1863.

*To all whom it may concern:*

Be it known that WARREN HALE and ALLEN GOODMAN, of Dana, in the county of Worcester and State of Massachusetts, did invent certain new and useful improvements in machinery for reducing blocks of wood to certain desired forms and planing the surfaces of the same smooth at one and the same operation; and we do hereby declare that the following is a full, clear, and exact description of the same, reference being had to the accompanying drawings, making a part of this specification, in which—

Figure 1 is a side elevation of the invention; Fig. 2, a longitudinal vertical section of the same, and Fig. 3 a transverse vertical section of the same.

Similar letters of reference indicate corresponding parts in the several figures.

This invention pertains to that class of machinery which has for its object the reducing of plain or rough blocks of wood to any desired irregular form, but differs, it is believed, both in its operation and results from those which have heretofore been contrived.

The machines which are now in use for the turning of lasts, gun-stocks, &c., produce their effects by the revolution of a pattern, which guides and thereby causes the cutting-tool to reduce the rough block to a similar form to the pattern, and the articles formed are irregular in all directions and are left in a rough state when delivered from the machine. In the within-described machine the model or pattern also governs the shape to be given to the rough block, but does not revolve; and while the articles produced by the same—such as polygonal piano-legs, &c, which heretofore have been made by hand mostly, if not exclusively—are irregularly or eccentrically shaped longitudinally, and their external surfaces in a transverse section are planes, and consequently cannot be produced, fashioned, or turned by a revolving cutter under the guidance of a revolving pattern; and, moreover, the surfaces, when cut by the within-described machine, are perfectly smooth and fitted for the application of veneers, &c.

The main features of the invention are, first, a rectangular carriage moving horizontally on rails and holding the rough block firmly in the center, and having also a perfect pattern on each side of the carriage; and, secondly, a revolving planing-cylinder similar to those in common use, arranged in a vertical sliding frame, the motions of said frame being controlled or guided by the patterns above named, as will be shown in the sequel.

A represents the frame-work, which may be made of wood or iron, put together in any proper way so as to properly support the working parts. B is the driving-drum, from which bands pass to and around each end of the planing-cylinder, to give it its requisite revolutions. *a a a* is the horizontal carriage, which is a rectangular frame strongly put together and moving forward and back on suitable rails, *b b*, fixed on the top of the frame-work A. Proper provisions are made for holding the rough block of wood *a'* in the center of this carriage by means of the common lathe-chuck, *c*, and the screw-holder *d*.

On each side of the carriage *a a a*, as hereinbefore suggested, a pattern, *e e e e*, is firmly fixed, the tops of which are finished smoothly and have longitudinally the irregularities or shape that it is desired to give the surfaces of the rough block *a'* in their longitudinal profile, and on which surfaces the planing-cylinder operates. The horizontal carriage *a a a* is moved forward and back by means of a rack, *f f*, and pinion *g*, Fig. 2, engaging with it.

The shaft *h*, on which the pinion *g* is fixed, is revolved by hand-power applied to a crank-wheel, *i*, on the same shaft with the cogged pinion *k*, (shown by dotted red lines in Fig. 1,) which pinion *k* works with the geared wheel *l* on the end of said shaft *h*.

The planing-cylinder *m*, Figs. 2 and 3, is constructed in the ordinary way with longitudinal knives attached to a cylinder, or to circular heads, but must be of small diameter, in order to make the abrupt turns necessary in giving shape to such articles as are to be wrought upon by the machine. The journals of this cylinder have bearings in the top of the vertical sliding frame *n n*, Figs. 2 and 3, said frame being provided with guide-rails *o o*, which move in grooves in the inside of the frame-work. This frame *n n* is hung, as it were, upon the patterns *e e e e* of the horizontal carriage by means of friction-rollers *p p*, attached to the exterior of said frame, and which rest on the top surfaces of said patterns. These rollers should be of the same diameter as the cutting or planing cylinder, in order to cause said cylinder to cut longitudinal irregularities on the block precisely similar to those of the patterns. A greater or less number of these friction-rollers may be placed between the journals of the cylinder and the tops of the patterns, (the diameter being kept as above specified,) in order to cut larger or smaller articles of the same shape.

The vertical motion of the frame *n n*, guided by the rollers, as aforesaid, is produced by the same means as is the horizontal motion for the carriage *a a a*—viz., the short rack *p'* and its pinion *g* on the shaft *r*, and the geared wheel S, cogged pinion *t*, and crank-wheel *u*, to which hand-power is applied, the whole arrangement and operation of these several parts being substantially the same as those described for similar parts connected to the horizontal carriage *a a a*.

The mode of operating our machine will be apparent without any lengthy description. The machine requires the care of only one operative, who moves the horizontal carriage *a a a* with one hand applied to the crank-wheel *i*, while the other, being applied to the crank-wheel *u*, raises and lowers the vertical sliding frame *n n*, which supports the planing-cylinder, the operator being guided in this part of the work by keeping the friction-rollers *p p* in contact with the top surfaces of the patterns *e e e e*, attached to the horizontal carriage. After one side of a piano-leg or other similar article has been cut out and planed, the other similar faces may be formed in the same manner by turning the rough block round, first, if a quadrilateral figure is required, through an arc of ninety degrees, then of one hundred and eighty degrees, and then two hundred and seventy degrees from the first point, the rough block being fastened or secured at the end of each quadrant by the spring-clutch *v*, which engages with holes in the face of the chuck *c*. If an octagonal figure is required, the rough block is turned at each movement just half the distance above specified to obtain the quadrilateral one. Any other polygonal figure may be produced by having the chuck *c* provided with a requisite number of holes, so that the spring-clutch *v* may engage successively with a number of them, at equal distances apart, and corresponding to the number of sides the block or finished article is required to have.

What is claimed as new, and desired to be secured by Letters Patent, is—

The combination of the carriage, the pattern or patterns, the tracing roller or rollers, the rotating cutting or planing cylinder, and the means for turning and holding the block of wood to be fashioned, as described, or the equivalents of them, or either of them, the said combination being so organized, substantially as described, that by its mode of operation the block of wood to be fashioned can be turned to present in succession each of its faces to the action of the cutter or planing cylinder, whose axis is at right angles, or nearly so, with the axis of the block of wood, so as to cut the wood longitudinally, while by a longitudinal movement the block of wood is gradually cut or planed from one end to the other on each face in succession, and by another movement at right angles thereto, or nearly so, the cutting action is caused to follow the irregular lines of the pattern, thereby producing a polygon of any desired number of sides, of any desired configuration longitudinally, and with all its sides of similar form.

WARREN HALE.
ALLEN GOODMAN.
LORENZO HALE.
JOHN M. GOODMAN.

Witnesses:
D. L. RICHARDS,
DANIEL STONE.